United States Patent
Tupolev et al.

[15] 3,677,502

[45] July 18, 1972

[54] SUPERSONIC AIRCRAFT

[72] Inventors: Andrei Nikolaevich Tupolev, Leninsky prospekt, 14; Alexei Andreevich Tupolev, ulitsa Stanislavskogo, 15, kv. 25; Georgy Alexeevich Cheremukhin, Krasnokazarmennaya, 9, kv. 174; Valentin Ivanovich Bliznjuk, ulitsa 11 Parkovaya, 37, korpus 3, kv. 46, all of Moscow; Alexandr Leonidovich Pukhov, ulitsa Gagarina, 35, kv. 47, Zhukovsky Moskovskoi oblasti; Georgy Petrovich Svischev, ultisa Kirova, 40a, kv. 26; Georgy Sergeevich Bjushgens, ulitsa Suvorovskaya, I/2, kv. 26, both of Moscow; Vitaly Georgievich Mikeladze, ulitsa Mayakovskogo, 17, kv. 20, Zhukovsky Moskovskoi oblasti, all of U.S.S.R.

[22] Filed: March 10, 1970

[21] Appl. No.: 18,049

[30] Foreign Application Priority Data

March 10, 1969 U.S.S.R.................................1348853
March 10, 1969 U.S.S.R.................................1348854

[52] U.S. Cl..............................................244/13, 244/119
[51] Int. Cl.............................................................B64c 1/00
[58] Field of Search..............................244/13, 55, 119, 123

[56] References Cited

UNITED STATES PATENTS

2,623,720  12/1952  Fortunato.............................244/106

OTHER PUBLICATIONS

Jane's All the World's Aircraft, 1965– 1966, p. 339, " Tupolev Tu– 144."

Primary Examiner—Andrew H. Farrell
Attorney—Holman & Stern

[57] ABSTRACT

A supersonic aircraft particularly for use under the conditions of an endurance flight at supersonic speeds in which the fuselage is provided with a delta wing having engines mounted under the middle portion thereof and with a tail portion disposed behind the wing. The cross section of the aircraft tail portion is convex along its whole length, with the tail portion proper being somewhat raised with respect to the wing from its bottom to the end to preclude the contact thereof with the gas stream exhausted from the engines and the nose portion has substantially improved properties of reflecting heat rays.

2 Claims, 4 Drawing Figures

Patented July 18, 1972 3,677,502

INVENTORS
A. N. TUPOLEV ET AL.
Holman, Glascock, Downing & Seebold
ATTORNEYS

SUPERSONIC AIRCRAFT

BACKGROUND OF THE INVENTION

The present invention relates to a supersonic aircraft in which the tail portion of the fuselage is provided with a fin and is disposed behind a delta wing having engines mounted under the middle portion thereof.

The aircraft according to the present invention can be most successfully used under the conditions of an endurance flight at a supersonic speed.

One of the problems arising when building and operating supersonic aircraft is to preclude the contact between the gas stream exhausted from the engines and the fuselage of the aircraft. This problem results from the fact that the engines are mounted under the wing and their nozzles face the tail portion of the fuselage. Because of this arrangement, some conventional supersonic aircraft have no tail portion (cf. Jane's All The World's Aircraft, 1966–1967, pp. 42, 124 and 295). In such aircraft, the vertical tail surfaces are disposed on the engine nacelles.

However, this disposition of the vertical tail surfaces worsens the aircraft directional stability, as the arm between these surfaces and the aircraft c.g. is too small. To compensate for this, the dimensions of the vertical tail surfaces are increased to such an extent that the aerodynamic resistance and weight of the aircraft become much greater.

Known in the art is a supersonic aircraft having a tail portion of the fuselage. To preclude the contact between the gas stream and this tail portion, the contour of the cross section of the latter has cavities in the zones of the possible contact with the gas stream (cf. Flugwelt International, Oct. 1964, pp. 780 and 781). It is clear that, in order to increase the strength of such a cross section, the fuselage must either be provided with relatively thick walls, or have connections, which result in a greater weight of the aircraft and, consequently, in a greater labor input required for the manufacture of the fuselage.

It is an object of the present invention to eliminate the above-mentioned difficulties existing in the art.

SUMMARY OF THE INVENTION

The main object of the present invention is to provide a supersonic aircraft having a tail portion of the fuselage disposed behind a delta wing and carrying a fin, in which the contour of the cross section of the tail portion is a relatively simple shape which precludes the contact thereof with the gas stream exhausted from the engines mounted under the middle portion of the wing.

According to the present invention the objects are accomplished in that the contour of the cross section of the tail portion of the fuselage is convex along its whole length, and the tail portion is somewhat raised with respect to the wing from its bottom to the end to preclude the contact thereof with the gas stream exhausted from the engines.

To decrease the aerodynamic resistance of the tail portion of the fuselage, it is expedient to fashion the upper surface of the tail portion as a straight line parallel to the fuselage base line.

To decrease the vertical size of the cross section of the fuselage tail portion, and to dispose the geometric center of this section as close as possible to the level of disposition of the wing, it is desirable to fashion the contour of the cross section as two arcs of different circumferences, disposed one above the other. At the same time, it is expedient to describe the lower arc by a greater radius than the upper arc, with the boundary between the arcs within the limits of the hermetically sealed fuselage being disposed at the level of the floor of the cabin.

It is most expedient to take the ratio between the radii within the range of 1.3–1.7, wherein the smaller limit refers to the end of the tail portion and the greater limit to the beginning thereof. With the boundary disposed at the level of the floor, it becomes possible to include the floor into the connection increasing the rigidity of the cross section of the tail portion of the fuselage.

A substantial advantage of the present invention is that the weight of the tail portion of the fuselage is considerably decreased, and its shape provides for an easy and simple mounting of thermal shields if such are required.

The following detailed description of a preferred embodiment of the aircraft according to the present invention is given with reference to the accompanying drawings, in which:

DETAILED DESCRIPTION OF THE INVENTION

Figure 1:
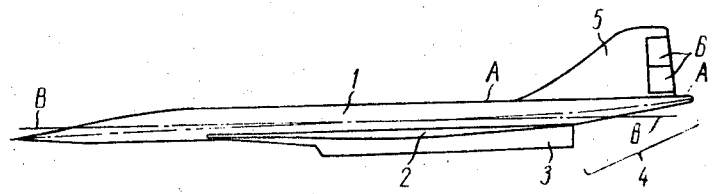
FIG. 1 is a view in side elevation of a supersonic aircraft, according to the invention.
Figure 2:
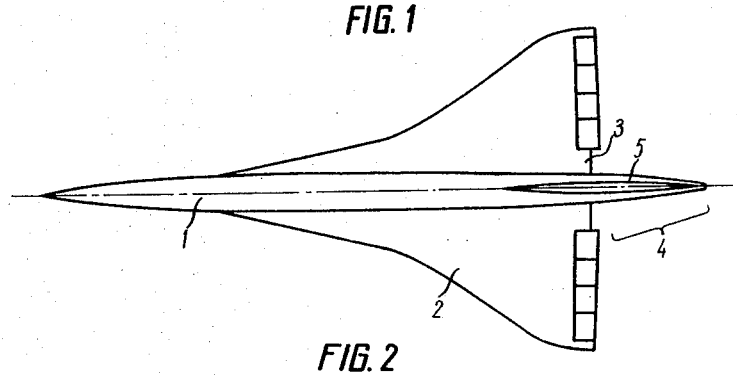
FIG. 2 is a top view of the aircraft shown in FIG. 1.
Figure 3:
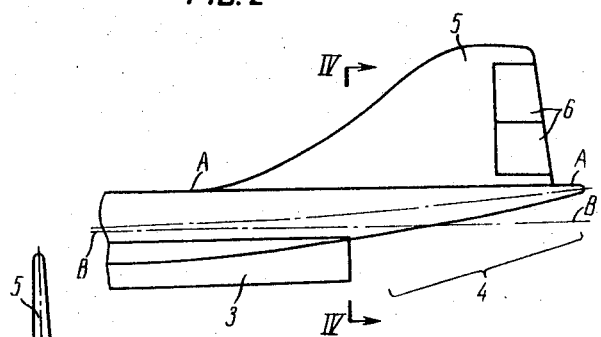
FIG. 3 is a fragmentary view in side elevation and on an enlarged scale of the tail portion of the fuselage.

The supersonic aircraft comprises an elongated fuselage 1 (FIGS. 1 and 2) having a delta wing 2 disposed in the lower portion thereof. Mounted under the middle portion of the wing 2 are engines 3. The fuselage 1 has a tail portion 4 carrying a fin 5 and rudders 6 and such tail portion is disposed behind the wing 2. The tail portion 4 (FIGS. 1 and 3) is somewhat raised with respect to the wing 2 from its bottom to the end to preclude the contact thereof with the gas stream exhausted from the engines 3.

Figure 4:
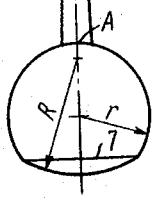
FIG. 4 is a section taken along line IV—IV of FIG. 3, the view looking in the direction of the arrows.

The contour of the cross section of the fuselage 1 tail portion 4 is convex along its whole length, as seen in FIG. 4. To decrease the aerodynamic resistance of the tail portion, its upper surface A—A (FIGS. 1 and 3) is made as a straight line parallel to the fuselage base line B—B.

The vertical size of the cross section of the tail portion of the fuselage is decreased, and the geometric center of this section is brought as close as possible to the level of disposition of the wing, due to the fact that the contour of the cross section is defined as two arcs of different circumferences, disposed one above the other. As seen in FIG. 4, the lower arc is described by a radius R which exceeds radius $r$ of the upper arc by 1.3–1.7 times. The greater limit of this ratio refers to the contour of the section disposed at the wing, and the smaller limit to the contour of the section disposed at the end of the tail portion 4.

The boundary between the arcs within the limits of the hermetically sealed fuselage is essentially a floor 7 of the cabin (not shown in the drawing), which serves as a connection increasing the strength of the cross section of the tail portion 4.

As compared to the known aircraft, the tail portion 4 has a smaller weight due to the convex shape of the cross section, and, if need be, can mount thermal shields in a simple manner.

What we claim is:

1. A supersonic aircraft comprising an elongated fuselage having a tail portion, said fuselage being hermetically sealed and provided with a cabin floor, a delta wing arranged in the lower portion of the fuselage, engines mounted under the middle portion of the wing, said tail portion having a cross-section throughout the entire length thereof defined by two arcs of different radii arranged one under the other, the radius of the lower arc exceeding the radius of the upper arc, and the boundary between said two arcs within the limits of the sealed fuselage being disposed at the level of the cabin floor.

2. The aircraft according to claim 1, in which said radius of said lower arc exceeds said radius of said upper arc by 1.3–1.7 times.

* * * * *